(12) United States Patent
Able et al.

(10) Patent No.: US 6,822,672 B1
(45) Date of Patent: Nov. 23, 2004

(54) PRINTHEAD AND FUSER STANDBY MANAGEMENT

(75) Inventors: Douglas Anthony Able, Shelbyville, KY (US); Cyrus Bradford Clarke, Lexington, KY (US); David John Mickan, Lexington, KY (US); Kevin Dean Schoedinger, Nicholasville, KY (US); Thomas Campbell Wade, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/602,151

(22) Filed: Jun. 24, 2003

(51) Int. Cl.[7] .................................. B41J 27/00
(52) U.S. Cl. ........................ 347/261; 347/243
(58) Field of Search ................ 347/243, 260, 347/261, 132; 399/1, 44, 70

(56) References Cited

U.S. PATENT DOCUMENTS

| | | | | |
|---|---|---|---|---|
| 4,589,764 A | * | 5/1986 | Tadokoro et al. | 347/132 |
| 5,321,479 A | * | 6/1994 | Yoshida et al. | 399/70 |
| 5,832,332 A | * | 11/1998 | Sugiura | 399/44 |
| 5,867,748 A | * | 2/1999 | Takahashi et al. | 399/1 |
| 6,570,604 B2 | | 5/2003 | Able et al. | 347/262 |

* cited by examiner

*Primary Examiner*—Hai Pham
(74) *Attorney, Agent, or Firm*—John A. Brady

(57) ABSTRACT

A laser printer having a rotating mirror (116) and a heat fuser (220) is operated with a sequence of standby conditions. At the end of a print job mirror (116) is continued to be rotated at printing speed while the temperature of fuser (220) is reduced somewhat. This is maintained for a short time, after which the speed of rotation of mirror (116) is reduced significantly and the fuser (220) temperature is reduced significantly. This is maintained for a time, after which the mirror is no longer rotated (or, if practical, is rotated very slowly) and the fuser temperature is further reduced. At any time when a subsequent print job is received, the mirror and fuser are brought to printing state and the period of times are next started from a beginning state.

13 Claims, 4 Drawing Sheets

PRINTHEAD AND FUSER STANDBY MANAGEMENT

TECHNICAL FIELD

This invention relates to improving the total job time, especially the time of first print. More specifically this invention relates selection of standby conditions of both the printhead motor and the fuser heater of a printer or other imaging device.

BACKGROUND OF THE INVENTION

The term "standby" in the imaging field is typically used to describe a state between print jobs in which the printer is in a condition for faster printing of the first sheet than if the printer were completely off. Typically, the fixing fuser temperature is kept at an intermediate level during standby so that fuser can be heated to operating temperature sooner. It is known too have a first standby fuser temperature which is maintained for a limited time between jobs, followed by lower standby temperatures for longer times between jobs. This accepts higher energy usage shortly after a job is completed, since often a new print job follows quickly after a current print job.

A commercial printer sold by the assignee of this invention several years ago continued printing speeds of the laser mirror motor and continued fusing temperature for a few seconds (believed to have been 4 seconds) after each print job to be ready for a next print job. This was followed by a lower fuser temperature and mirror motor off.

It is also known from inspection of a prior, commercially available printer (the XEROX N32) that the motor rotating the mirror of a laser printhead is idled at an intermediate speed during a standby state after a print job. In addition to using energy, the mirror rotation causes some sounds that may be distracting.

This invention provides multi-levels of both mirror motor idling and fuser temperature for good standby performance.

DISCLOSURE OF THE INVENTION

In accordance with this invention, immediately after a print job the printhead operation is fully continued, in that the mirror motor runs at full speed and the laser is activated. The fuser temperature is reduced somewhat. In this state the first page of a subsequent job can be printed generally as soon as paper can be supplied from the paper source.

After the predetermined time employed for the first state, the mirror motor revolution speed is reduced significantly, the laser is deactivated, and the fuser temperature is further reduced. Some delay will be experienced, but time to first print of the next job is improved over a less energetic standby state. In general, an ideal setting for this state is that in which the fuser and the printhead reach activation for printing at approximately the same time after printing is resumed (i.e., the printhead is ready when imaging begins and the fuser reaches operating temperature when fusing begins).

After the second predetermined time, the mirror motor is turned off, the laser is kept deactivated, and the fuser temperature is reduced a further amount. This state is like a common standby state in that the motor is quiet and the time to first printing requires time for the printhead to reach operating state.

During all of these standby conditions, when a new print job is recognized, the printhead and fuser are brought to printing conditions and the predetermined times are returned to their beginning states.

Accordingly, the foregoing defines at least three modes different from the printing mode. Other intermediate modes consistent with the decrease in mirror speed and temperature of the foregoing modes are clearly consistent with this invention.

DESCRIPTION OF THE DRAWINGS

The details of this invention will be described in connection with the accompanying drawings, in which.

DESCRIPTION OF THE PREFERRED EMBODIMENTS

Figure 1:
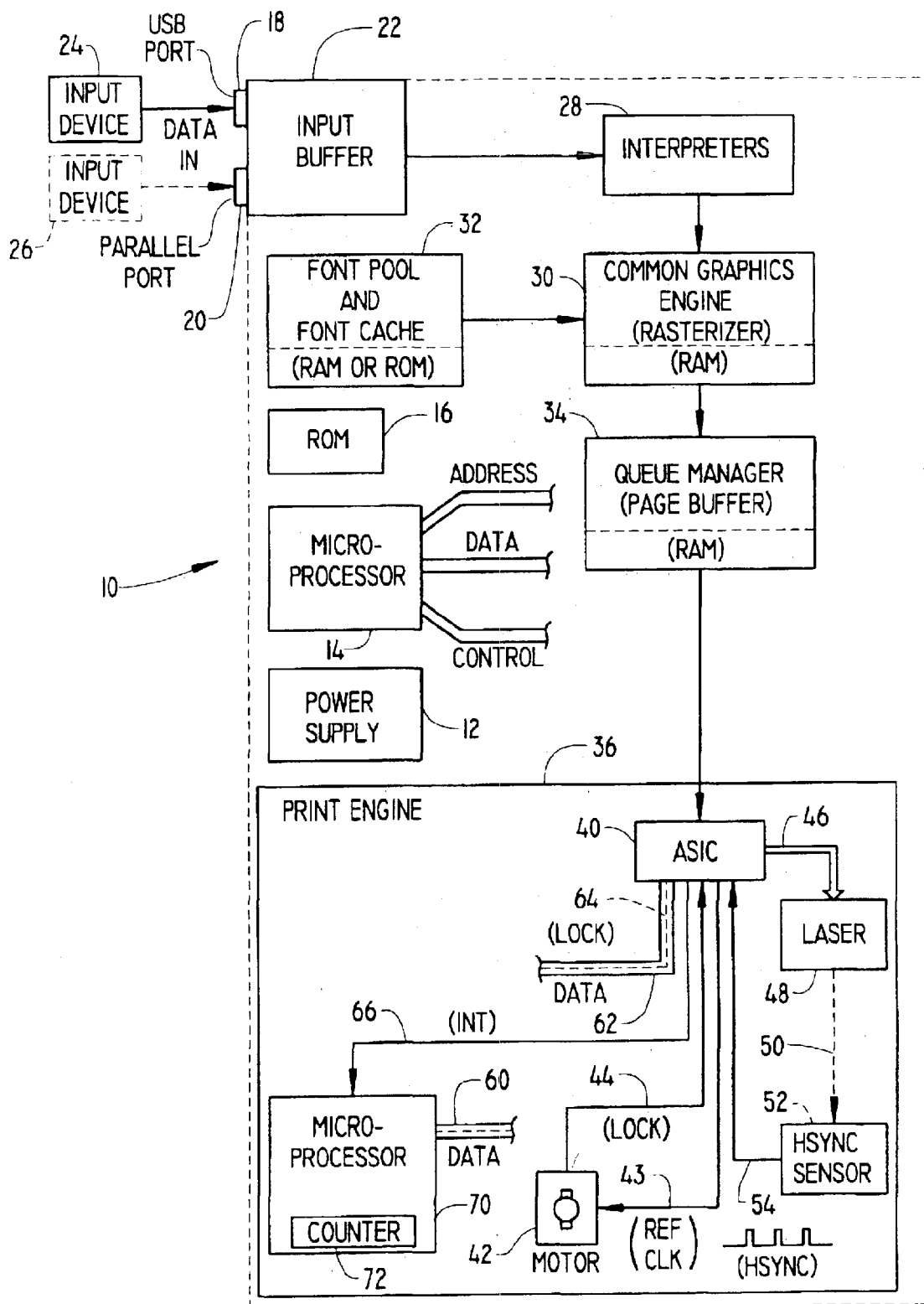
FIG. 1 is a hardware block diagram of major hardware components used in a laser printer which may incorporate this invention.

Printing system:

Referring now to the drawings, FIG. 1 shows a hardware block diagram of a laser printer generally designated by the reference numeral 10. Laser printer 10 will preferably contain certain relatively standard components such a DC power supply 12 which may have multiple outputs of different voltage levels, a microprocessor 14 having address lines, data lines and control and/or interrupt lines. Read Only Memory (ROM) 16, and Random Access Memory (RAM), which is divided into several portions for performing several different functions.

Laser printer 10 will typically contain at least one network input (not shown), parallel input or USB port, or in many cases two types of input ports, so designated by the reference numeral 18 for the USB port and the reference numeral 20 for the parallel port. Each of these ports 18 and 20 would be connected to a corresponding input buffer, generally designated by the reference numeral 22 on FIG. 1. USB port 18 would typically be connected to a USB output port of a personal computer or a workstation that would contain a software program such as a word processor or a graphics package or computer aided drawing package. Similarly, parallel port 20 could also be connected to a parallel output port of the same type of personal computer or workstation containing the same type of programs, only the data cable would have several parallel lines. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM and RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a queue manager or page buffer, which is a portion of RAM, designated by the reference numeral 34. In a typical laser printer, an entire page of rasterized data is stored in the queue manager during the time interval that it takes to physically print the hard copy for that page. The data within the queue manager 34 is communicated in real time to a print engine designated by the reference numeral 36. Print engine 36 includes the laser light source within the printhead, and its output results in physical inking onto a piece of paper, which is the final print output from laser printer 10.

It will be understood that the imaging device might receive data from a scanner (not shown) or by facsimile, and therefore not need some of the image processing elements discussed in the foregoing.

It will be understood that the address, data and control lines are typically grouped in buses, and which are physically communicated in parallel (sometimes also multiplexed) electrically conductive pathways around the various electronic components within laser printer 10. For example, the address and data buses are typically sent to all ROM and RAM integrated circuits, and the control lines or interrupt lines are typically directed to all input or output integrated circuits that act as buffers.

Print engine 36 contains an ASIC (Application Specific Integrated Circuit) 40, which acts as a controller and data manipulating device for the various hardware components within the print engine. The bitmap print data arriving from Queue Manager 34 is received by ASIC 40, and at the proper moments is sent via signal lines 46 to the laser, which is designated by the reference numeral 48.

ASIC 40 controls the various motor drives within the print engine 36, and also receives status signals from the various hardware components of the print engine. A motor 42 is used to drive the faceted mirror (see the polygonal mirror 116 on FIG. 2) and when motor 42 ramps up to a rotational speed (i.e., its "lock" speed) that is dictated or measured by the frequency of a reference signal ("REF CLK") at a signal line 43, a "Lock" signal will be enabled on a signal line 44 that is transmitted to ASIC 40.

The lock signal may be dictated or controlled by various alternatives. Where the lock speed is to be different for different applications by the same printer, 10, reference frequencies are supplied to track motor 42 tracks supporting different lock speeds at different reference frequencies. Where only a single lock speed is to be employed by motor 42, the HSYNC signal (discussed below) may be used for a predetermined comparison to motor speed defining lock. Virtually any practical means to determine when a motor is at a stabilized, predetermined speed are alternatives and many such means are well within the state of the art or maybe developed in the future.

For purposes of this invention lock speed equates to the speed of rotation of mirror 116 (FIG. 2) employed for actual printing of a given page of a given print job. This invention maintains that speed for a given time after printing and then continues rotation for a given time subsequently, as described in detail below.

During conventional operation, once ASIC 40 receives the lock signal from motor 42, it transmits a corresponding lock signal (as part of a byte of a digital signal) along one of the data lines 64 of the data bus 62 that communicates with ASIC 40. Data bus 62 is either the same as the data bus 60 that communicates with microprocessor 70, or a portion thereof. (In practice microprocessor 70 and microprocessor 14 may be a single microprocessor.) When this lock status signal is received by microprocessor 70, microprocessor 70 initiates action of printer 10 leading to printing by printer 10 in normal course.

The HSYNC signal is received from an optical sensor designated by the reference number 52 and called the HSYNC sensor. The laser light source 110 (see FIG. 2) places a spot of light on the rotating polygonal mirror 116, which then redirects the laser light so that it ultimately sweeps or "scans" across a "writing line" on a photoconductive drum (218 in FIG. 3), thereby creating a raster line of either black or white print elements (also known as "pels"). As the laser light scans to create this raster line, the laser light momentarily sweeps across HSYNC sensor 52 at the beginning of each sweep or "scan" across one of the facets of polygonal mirror 116. The laser light travels from laser 110 to the HSYNC sensor 52 along a light path, designated diagrammatically by the reference numeral 50 on FIG. 1. This produces an electrical pulse output signal from HSYNC sensor 52, which is communicated to ASIC 40 by a signal line 54.

As related above, a counter, designated by the reference numeral 72, is allowed to operate within microprocessor 70 (alternatively, counter 70 is within ASIC 40) and its value is saved every time a signal is received over the control line 66. By use of the different values of the count taken at each interrupt, microprocessor 70 (alternatively, ASIC 40) can determine the frequency of HSYNC signal.

Figure 2:
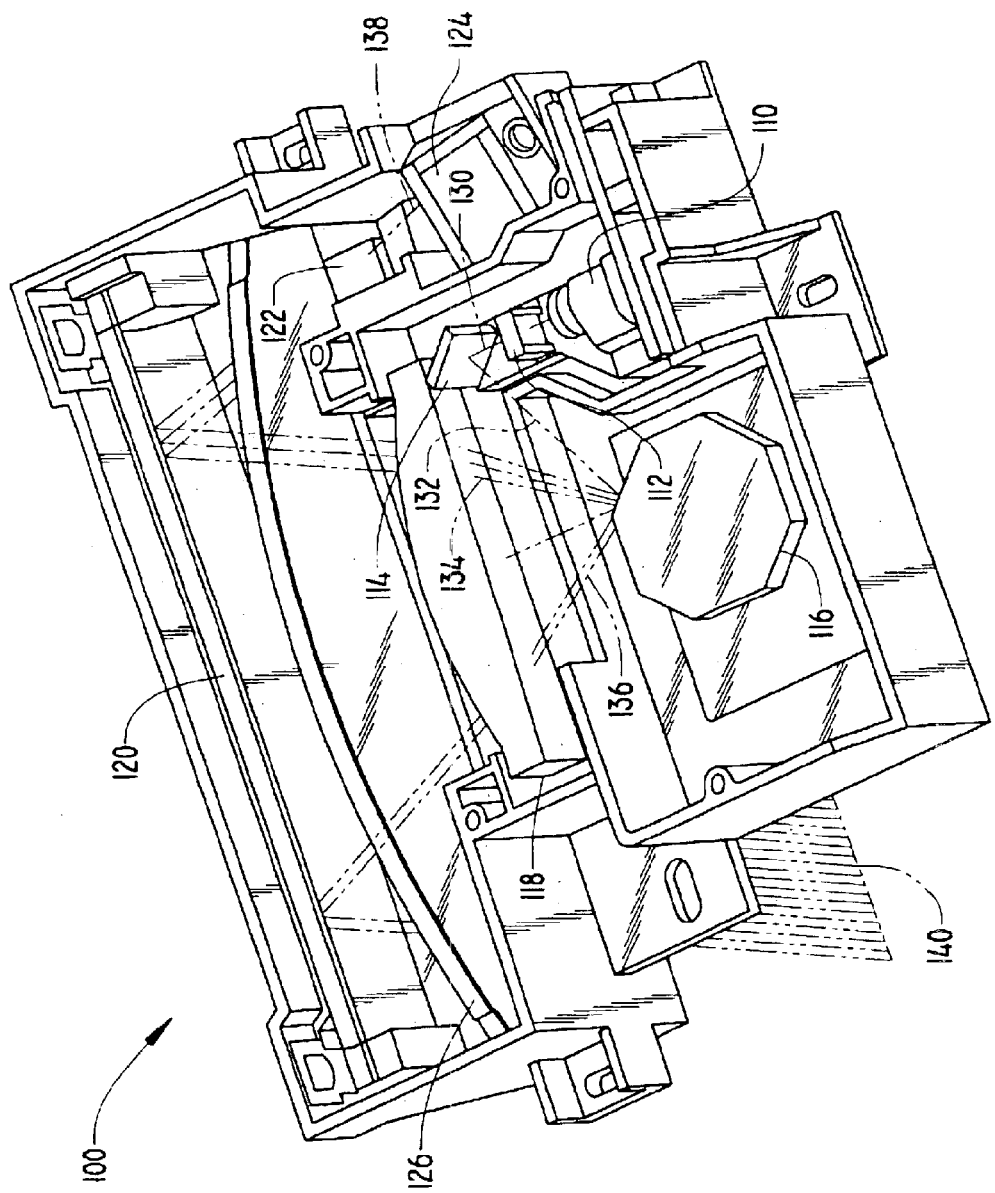
FIG. 2 is a perspective view in partial cut-away of a laser printhead with rotating mirror.

FIG. 2 provides a perspective partially cut-away view of some of the major components of a printhead 100 of laser printer 10. Starting at the laser light source 110, the light travels through a lens 112 along a pathway 130 and is redirected by a "pre-scan" mirror 114. The redirected light path, designated by a reference numeral 132, puts a spot of light on an eight-sided polygonal mirror 116. Some of the other major optical components within laser printer 10 include a lens 118, a "post-scan" fold mirror 120, a "start of scan" mirror 122, an optical sensor mounted to an HSYNC sensor card 124, and another lens 126 that directs the light into a "writing line" designated by reference 140.

After the laser light leaves the laser source 110, it is focused by lens 112 into a narrow beam that follows light path 130, before arriving a the pre-scan mirror 114. This mirror redirects the light into a path 132 which strikes a spot on the polygonal mirror 116. As mirror 116 rotates (due to motor 42), the reflected laser light is swept by one of the facets of mirror 116 from a starting position for each raster scan at the reference number 134, to an ending position of the raster scan at the reference numeral 136. The ultimate goal is to sweep the laser light across a photoconductive drum (not shown), thereby creating a series of parallel light paths as "writing lines" and designated by reference numeral 140. To achieve this writing line 140, the swept laser light is directed through lens 118 and reflected in a downward direction the fold mirror 120. The final lens 126 is used to provide the final aiming of the swept light that creates writing line 140.

A portion of the swept light that creates each raster scan is aimed by the polygonal mirror 116, lens 118, fold mirror 120, and a "start of scan" mirror 122 to create a light signal that follows the path designated by the reference numeral 138. Light that ultimately travels along path 138 will be directed to impact an optical sensor on the HSYNC sensor card 124, and the optical sensor is equivalent to the HSYNC sensor 52. seen on FIG. 1. In FIG. 2 since there are eight (8) facets or sides to polygonal mirror 116, each one-eighth rotation of mirror 116 will create an entire swept raster scan of laser light that ultimately becomes the writing line 140. For a small instant at the start of each of these scans, there will be a light beam that travels along path 138 to impact the HSYNC sensor 52 on the HSYNC sensor card 124. This HSYNC signal will be created during each scan at all times during normal operation of laser printer 10 when laser source 110 and motor 42 are running during a printing operation, even during scans in which there are no pels to be printed on the photoconductive drum in that scan. Laser source 110 is controlled such that it will produce no light at all for raster lines that are to be left blank on the final printed page, except for a brief moment at the end of each scan, so that the HSYNC signal will be produced at the beginning of each successive scan.

Figure 3:
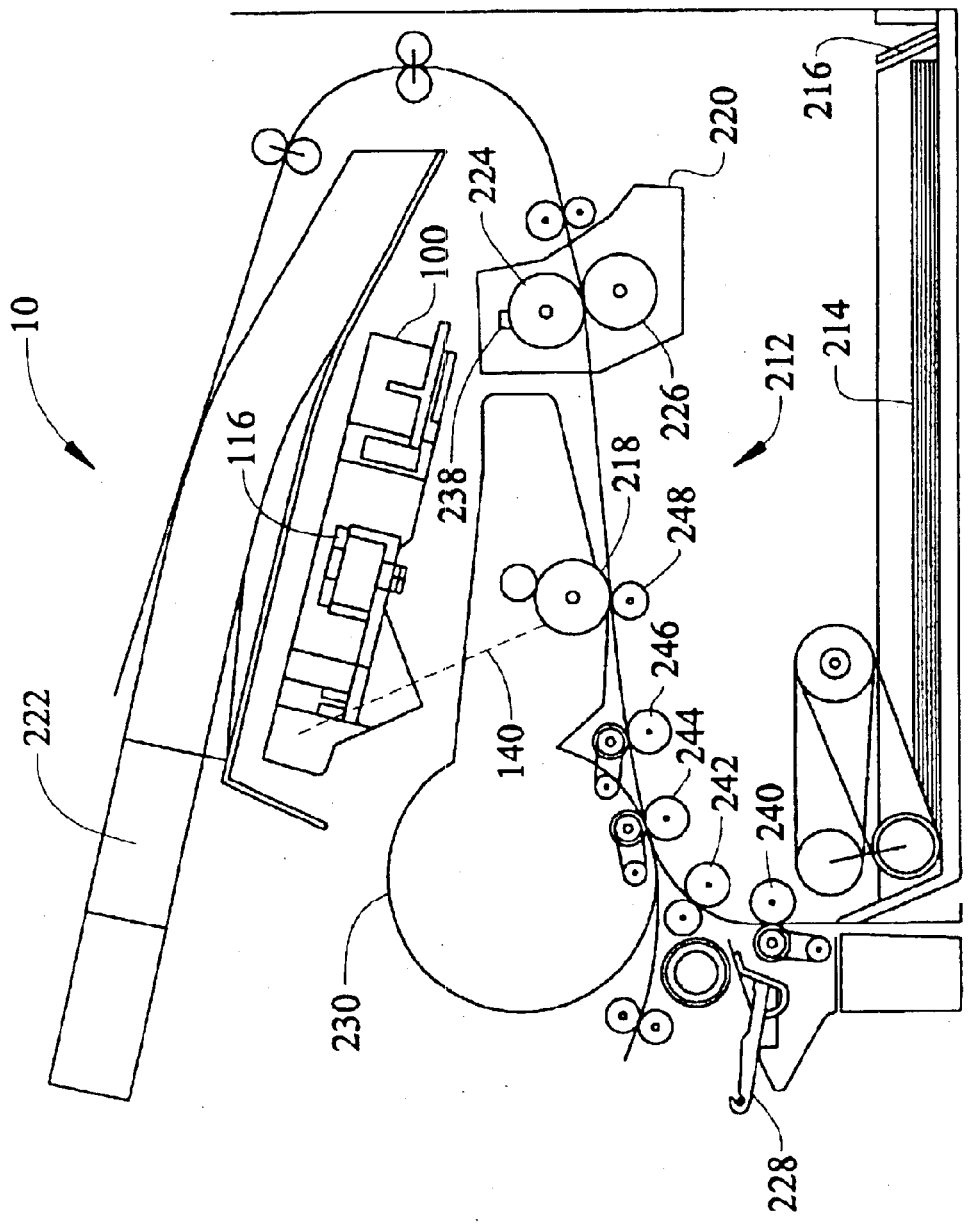
FIG. 3 is a cutaway, diagrammatic side view of major hardware elements of an illustrative laser printer which may incorporate this invention.

FIG. 3 illustrates major structural aspects of a representative printer 10. Printer 10 includes a media feed path 212 for feeding sheets of media 214, such as paper, from media tray 216 past a photoconductive drum 218 and a fuser assembly 220 to an output tray 222. The fuser assembly 20 may be a nip roller fuser formed by a fuser roller 224, which is heated to a relatively high temperature to fuse particles of toner to the sheets of media 214 and a backup roller 225

Special media, such as envelopes, transparencies or checks, are fed into the media feed path 212 from an external, front-option tray 228, sometimes referred to as a multi-purpose tray. Photoconductive drum 218 forms an integral part of a replaceable toner cartridge 230 inserted in the printer 10.

Printhead 100 is disposed in the printer 10 for scanning the photoconductive drum 218 with a laser beam 140 to form a latent image thereon. The laser beam 140 sweeps or "scans" across a "writing line" on the photoconductive drum 218, thereby creating, in a black and white laser printer, a raster line of either black or white print elements.

A plurality of rollers 240, 242, 244, 246, 248 function in a known manner to transfer the sheets of media 214 from the media tray 216 or multi-purpose tray 228 through the media feed path 212. As is entirely standard, the paper or other media 214 receives the toner image from drum 218 and advances into the nip of fuser roller 224 and backup roller 226, where the toner image is fixed to the media 214 by being fused with heat. A thermistor 238 or other heat sensor senses the temperature of the fuser 220, typically by being in contact with the fuser roller 224. This temperature information is communicated to microprocessor 70 (FIG. 1) and microprocessor 70 controls power to a heating element (not shown) in or near the fuser roller to control the temperature. Such control of fuser temperature is widely practiced in various forms, and any such control is consistent with this invention.

When mirror motor 42 is inactive, the time to reach printing speed can be much longer than the time to feed media 214 to the photoconductor drum 218. Accordingly, it is standard to delay printing until mirror motor 42 reaches a predetermined speed consistent to being ready to complete printing when media 214 contacts drum 218. Similarly, when fuser 220 is cool or only moderately warm, the time to reach fixing temperature can be much longer than the time required to convey media from media tray 216 to the fuser 220. Accordingly, it is common both to maintain fuser 220 at a high intermediate temperature (which is often termed a standby mode) and to delay printing as necessary.

In accordance with this invention, the significant delays of starting from a stationary or very slowly rotating mirror motor are avoided for a predetermined time. To practice this invention, normally the mirror 116 will be supported for rotation on a bearing (not shown) that is subject to virtually no wear during rotation, such as an air bearing. The reduction of fuser temperature is coordinated with reduction in speed of the mirror motor 42.

As the rotation of any mirror motor requires power and produces some sound, which may be distracting, the mirror is kept at full speed after a print job only for a brief period. This brief period can be selected in accordance with the needs of the user, but it is predetermined during the printing of successive print jobs. A typical period is, for example, about 6.5 seconds, as that is a period of somewhat high probability that a subsequent print job will be initiated. Where the input is from a scanner, a typical period is about 15 seconds because such copies more frequently follow within a 15 second interval.

To preserve power at the fuser, the temperature at the heater is reduced a small amount immediately after the print job is completed at the fuser. This lower temperature is selected to ensure that the fuser can be heated to reach the fixing temperature by the time a sheet of media reaches the fuser. (As laser deactivation may also delay printing from this state, typically activation of the laser will also be continued).

Longer periods are clearly consistent with this invention, although they do increase somewhat power usage and noise. Where the data does not come from a scanner, periods less than 10 seconds should be generally tolerable. Where the data does come from a scanner, periods less than 20 seconds should be generally tolerable. These time periods need not be rigid. They can be measured, for example, by the combination of the predetermined period for a media sheet to be sensed exiting the printer after leaving the fuser plus a time period actually measured by clocking after the media leaves the printer. (Such actual measurement is conventional and might be by microprocessor 70 or ASIC 40 employing a counter as discussed in the foregoing with respect to measuring HSYNC frequency.)

Accordingly, a first standby condition is established in which the mirror motor is at imaging speed and the fuser is a small amount below fusing temperature. A print job initiated during this first standby condition is not delayed since the fuser will reach the fixing temperature when toned media 214 reaches the fuser 220. In the illustrative printer 10 the reduction in the first standby condition may be from 208 degrees C. to 206 degrees C.

When the time period for the first standby condition passes with no new print job, the rotation speed of the mirror motor is reduced substantially. In the illustrative printer 10 that speed may be reduced from 46,000 revolutions per minute to 25,000, and, if the laser is activated, the power to the laser is removed to deactivate the laser. The fuser temperature is further reduced a moderate amount. In the illustrative printer 10 the reduction in the second standby condition may be from 206 degrees C. to 180 degrees C.

Accordingly, a second standby condition is established in which the mirror motor is at a much-reduced speed and the fuser temperature is significantly lower. A print job initiated during this second standby condition is delayed significantly. This second standby condition may be continued for a longer time than the first standby condition, as both power consumption and sound production is significantly less than during the first standby condition. A typical period to maintain the second standby condition is about 60 minutes. Longer periods for this standby condition are sometimes preferred and are employed. The period is normally at least 60 minutes.

It will be understood that the second standby condition may be implemented by a number of steps in which mirror rotation and fuser temperature are reduced during a second period.

After a certain period of time without a print job the mirror motor is stopped (or, if practical, reduced to very slow rotation) and the fuser temperature is further reduced (typically not further heated). In the foregoing example the temperature is reduced to 175 degrees C.

The turning off (or very slow rotation) of the mirror motor with a low fuser temperature constitutes a third standby condition. This third standby condition is standard in itself.

Figure 4:
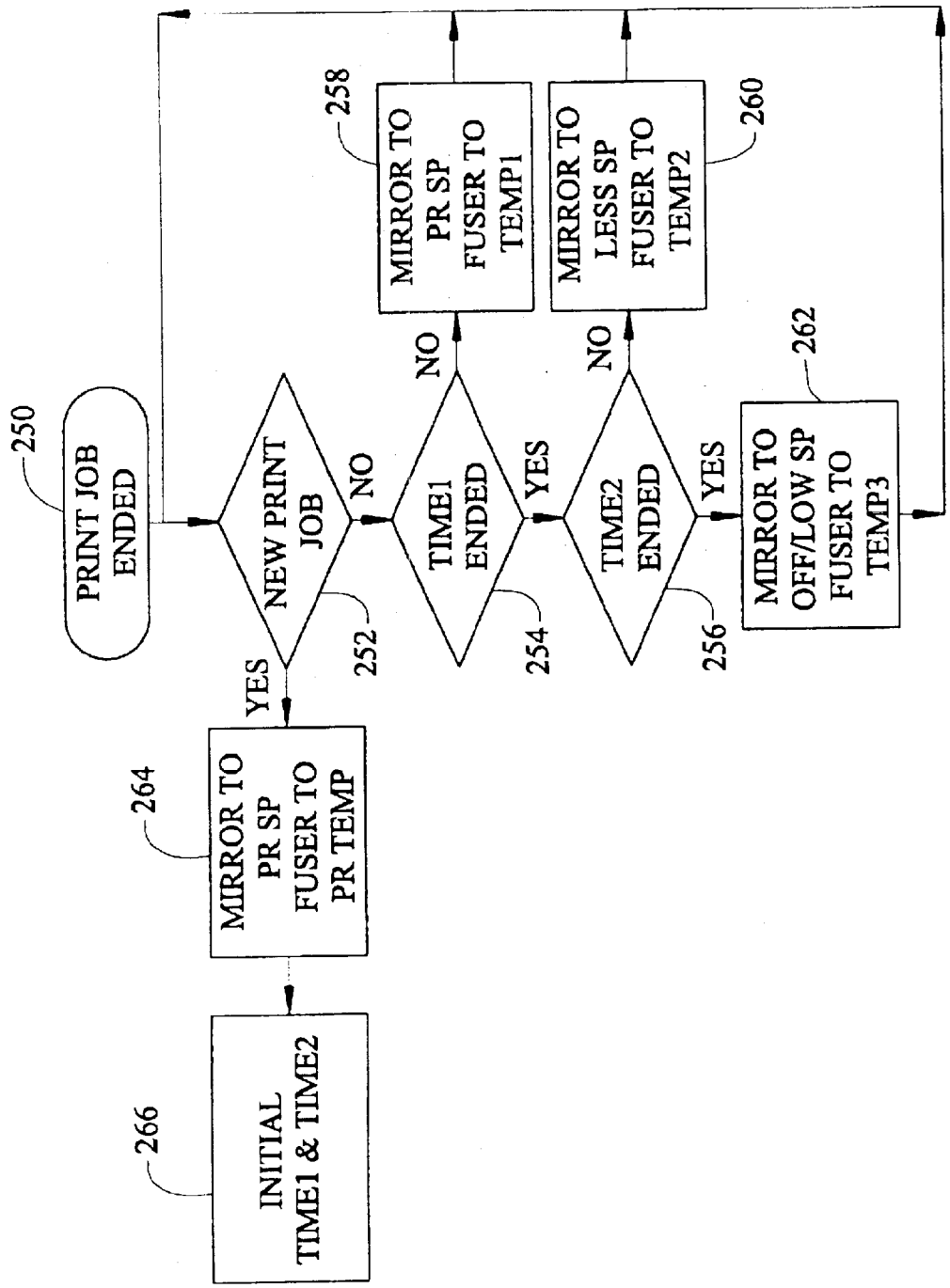
FIG. 4 is a flow diagram illustrating the operation of this invention.

The foregoing is implemented by microprocessor 70 or equivalent electronic logic such as by an ASIC. Such control, in itself, may employ existing printing systems, as discussed with respect to the illustrative embodiment 10 of FIGS. 1–3. The overall flow will be as illustrated by the flow diagram of FIG. 4. In FIG. 4 "PR" is used for "printing" and "SP" is used for "speed."

The starting event is the end of a print job, illustrated by action 250. The end of a print job may be defined in various ways. The last paper for a print job leaving the fuser nip may be physically sensed, with that event being interpreted as end of job. The trailing edge of paper may be sensed earlier in the printing activity and that event plus a predetermined delay being interpreted as end of job. Where the paper source is known and fixed, a predetermined delay after start of paper feed may be interpreted as end of job. Data delivering a print job typically identified the last page. Where such data is not available, each paper is considered the last page until the software responds to receipt of a subsequent page.

The end of job recognition 250 activates decision 252, which determines if a new print job is occurring. Print jobs are typically communicated to the printer as discussed in the foregoing with respect to FIG. 1. Accordingly, print jobs activate the imaging function and any unique imaging function can be interpreted as existence of a new print job.

When decision 252 is No, decision 254 is activated. Decision 254 determines whether a predetermined time has expired from print job end to the end of a first time period (termed "TIME1" in the drawing).

When decision 254 is No, action 258 is activated. Action 258 continues the mirror motor rotation at the speed for printing and reduces the fuser temperature to a first, somewhat lower temperature from the fuser temperature for printing (termed "TEMP1" in the drawing). When action 258 is activated, the system returns to decision 252 to monitor for a new print job.

When decision 254 is Yes, decision 256 is activated. Decision 256 determines whether a predetermined time has expired from print job end to the end of a second time period (termed "TIME2" in the drawing).

When decision 256 is No, action 260 is activated. Action 260 continues the mirror motor rotation. Action 260 reduces the mirror motor speed significantly and further reduces the fuser temperature to a second temperature (termed "TEMP2" in the drawing). When action 260 is activated, the system returns to decision 252 to monitor for a new print job.

When decision 256 is Yes, action 262 is activated. Action 262 reduces the mirror motor speed to off (or, if practical, to a very low speed) and further reduces the fuser temperature to a third temperature (termed "TEMP3" in the drawing), which typically is "off" or no heating. When action 262 is activated, the system returns to decision 252 to monitor for a new print job.

When decision 252 is Yes, action 264 is activated, which brings the mirror rotation to printing speed and the fuser temperature to printing temperature, at which toner is fixed by the fuser. Additionally, TIME1 and TIME2 are initialized or otherwise configured to started from beginning, so that both are at zero level when the current print job ends. (The time of such initialization need not occur at the start of printing so long as it occurs before or substantially simultaneously with the print job ended state.) (As stated in the foregoing, the measurement of the times, TIME1 and TIME2 in this example, may be estimated from events in part or in whole, rather than being measured by rigid clocking.)

As much of the system control with respect to this invention is by software or electronic logic, such as an ASIC, implementation details may take a variety of forms so long as the standby sequence is consistent with the foregoing description.

What is claimed is:

1. A method of imaging employing an imaging device having a rotated mirror to direct light and a fuser to fix toner with heat comprising the steps of determining that a print job has ended, determining that a subsequent print job is occurring, maintaining rotation of said mirror at imaging speed while reducing the temperature of said fuser to a first temperature for a first period of time starting when said determining that a print job has ended so determines and ending after a first time period or until said determining that a subsequent print job is occurring so determines, reducing rotation speed of said mirror to a second speed while reducing the temperature of said fuser to a second temperature lower than said first temperature for a second period of time starting when said first period of time has elapsed and no new print job has occurred and ending after a second time period and reducing rotation speed of said mirror to off or to a slow, third speed while reducing the temperature of said fuser to a third temperature lower than said second temperature until said determining that a further print job is occurring so determines.

2. The method as in claim 1 in which said first period of time is less than 10 seconds.

3. The method as in claim 2 in which said first period of time is about 6.5 seconds.

4. The method as in claim 3 in which said second period of time is more than about 60 minutes.

5. The method as in claim 4 in which said second period of time is about 60 minutes.

6. The method as in claim 2 in which said second period of time is more than 60 minutes.

7. The method as in claim 6 in which said second period of time is about 60 minutes.

8. The method as in claim 1 in which said first period of time is less than 20 seconds.

9. The method as in claim 8 in which said first period of time is about 15 seconds.

10. The method as in claim 9 in which said second period of time is more than about 60 minutes.

11. The method as in claim 10 in which said second period of time is about 60 minutes.

12. The method as in claim 8 in which said second period of time is more than about 60 minutes.

13. The method as in claim 12 in which said second period of time is about 60 minutes.

* * * * *